United States Patent
Muramatsu

(10) Patent No.: US 10,363,641 B2
(45) Date of Patent: Jul. 30, 2019

(54) MACHINE TOOL

(71) Applicant: FANUC CORPORATION, Yamanashi (JP)

(72) Inventor: Toshifumi Muramatsu, Yamanashi-ken (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 15/925,878

(22) Filed: Mar. 20, 2018

(65) Prior Publication Data

US 2018/0272486 A1    Sep. 27, 2018

(30) Foreign Application Priority Data

Mar. 22, 2017 (JP) .................. 2017-055931

(51) Int. Cl.
    B23Q 3/157    (2006.01)
    B23Q 3/155    (2006.01)
    B23Q 1/54     (2006.01)

(52) U.S. Cl.
    CPC ....... B23Q 3/15706 (2013.01); B23Q 1/5406 (2013.01); B23Q 3/15534 (2016.11); Y10S 483/90 (2013.01); Y10T 483/1795 (2015.01)

(58) Field of Classification Search
    CPC ........... B23Q 3/15534; B23Q 3/15706; B23Q 3/15506; Y10T 483/1752; Y10T 483/1755;

(Continued)

(56) References Cited

U.S. PATENT DOCUMENTS

2012/0049469 A1    3/2012   Michel et al.
2013/0345034 A1*  12/2013   Liu ................... B23Q 3/15706
                                                          483/38

(Continued)

FOREIGN PATENT DOCUMENTS

| JP | 56-003161 A  | * | 1/1981 |
| JP | 60-127937 A  | * | 7/1985 |
| JP | 54103 A      |   | 1/1993 |
| JP | 2009233791 A |   | 10/2009 |
| JP | 201261526 A  |   | 3/2012 |
| JP | 2015077671 A |   | 4/2015 |
| JP | 2015202539 A |   | 11/2015 |
| JP | 2015205373 A |   | 11/2015 |

(Continued)

OTHER PUBLICATIONS

Machine translation of JP 56-003161 A, which JP '161 was published Jan. 1981.*

(Continued)

*Primary Examiner* — Erica E Cadugan
(74) *Attorney, Agent, or Firm* — Fredrikson & Byron, P.A.

(57) ABSTRACT

A machine tool includes: a revolving-type turret including a plurality of grips provided along a circumferential direction thereof, each of the plurality of grips being configured to hold the tool attached to a spindle; a first rotary shaft configured to rotate about a swing axis of the turret; a second rotary shaft extending in a direction substantially perpendicular to the first rotary shafts, and configured to rotate the turret about a revolving axis; a motor configured to rotate the first rotary shaft; a power transmission unit including a first gear connected to the first rotary shafts and a second gear connected to the second rotary shaft, the second gear being configured to be meshed with the first gear; and a rotation prohibition unit configured to, when swinging the turret, prohibit rotation of the second rotary shaft in order to swing the second rotary shaft about the first rotary shaft.

2 Claims, 7 Drawing Sheets

(58) Field of Classification Search
CPC ........... Y10T 483/1757; Y10T 483/176; Y10T 483/179; Y10T 483/1793; Y10T 483/1795; Y10T 483/1798; Y10T 483/1882; Y10S 483/90
USPC .......................... 483/38–41, 900, 54–57, 67
See application file for complete search history.

(56) References Cited

U.S. PATENT DOCUMENTS

| 2015/0111710 A1* | 4/2015 | Murota | B23Q 3/15526 483/13 |
|---|---|---|---|
| 2015/0290755 A1 | 10/2015 | Isobe et al. | |
| 2015/0298270 A1 | 10/2015 | Isobe et al. | |
| 2016/0062343 A1* | 3/2016 | Miyawaki | G05B 19/12 700/179 |

FOREIGN PATENT DOCUMENTS

| JP | 2016047562 A | 4/2016 |
|---|---|---|
| JP | 2016067569 A | 5/2016 |

OTHER PUBLICATIONS

English Abstract and Machine Translation for Japanese Publication No. 2016-047562 A, published Apr. 7, 2016, 11 pages.
English Abstract and Machine Translation for Japanese Publication No. 2015-077671A, published Apr. 23, 2015, 8 pages.
English Machine Translation of Decision to Grant issued by Japan Patent Office (JPO) in Japanese Application No. 2017-055931, dated Nov. 6, 2018, 3 pages.
Untranslated Decision to Grant issued by Japan Patent Office (JPO) in Japanese Application No. 2017-055931, dated Nov. 6, 2018, 3 pages.
English Machine Translation of Notification of Reasons for Refusal issued by Japan Patent Office (JPO) in Japanese Application No. 2017-055931, dated Jul. 31, 2018, 3 pages.
Untranslated Notification of Reasons for Refusal issued by Japan Patent Office (JPO) in Japanese Application No. 2017-055931, dated Jul. 31, 2018, 4 pages.
English Abstract for Japanese Publication No. 2015-202539 A, published Nov. 16, 2015, 2 pgs.
English Abstract and Machine Translation for Japanese Publication No. 2016-067569 A, published May 9, 2016, 10 pgs.
English Abstract and Machine Translation for Japanese Publication No. 05-004103 A, published Jan. 14, 1993, 5 pgs.
English Abstract for Japanese Publication No. 2015205373 A, published Nov. 19, 2015, 1 pg.
English Abstract and Machine Translation for Japanese Publication No. 2012-061526 A, published Mar. 29, 2012, 10 pgs.
English Abstract and Machine Translation for Japanese Publication No. 2009-233791, A, published Oct. 15, 2009, 8 pgs.

* cited by examiner

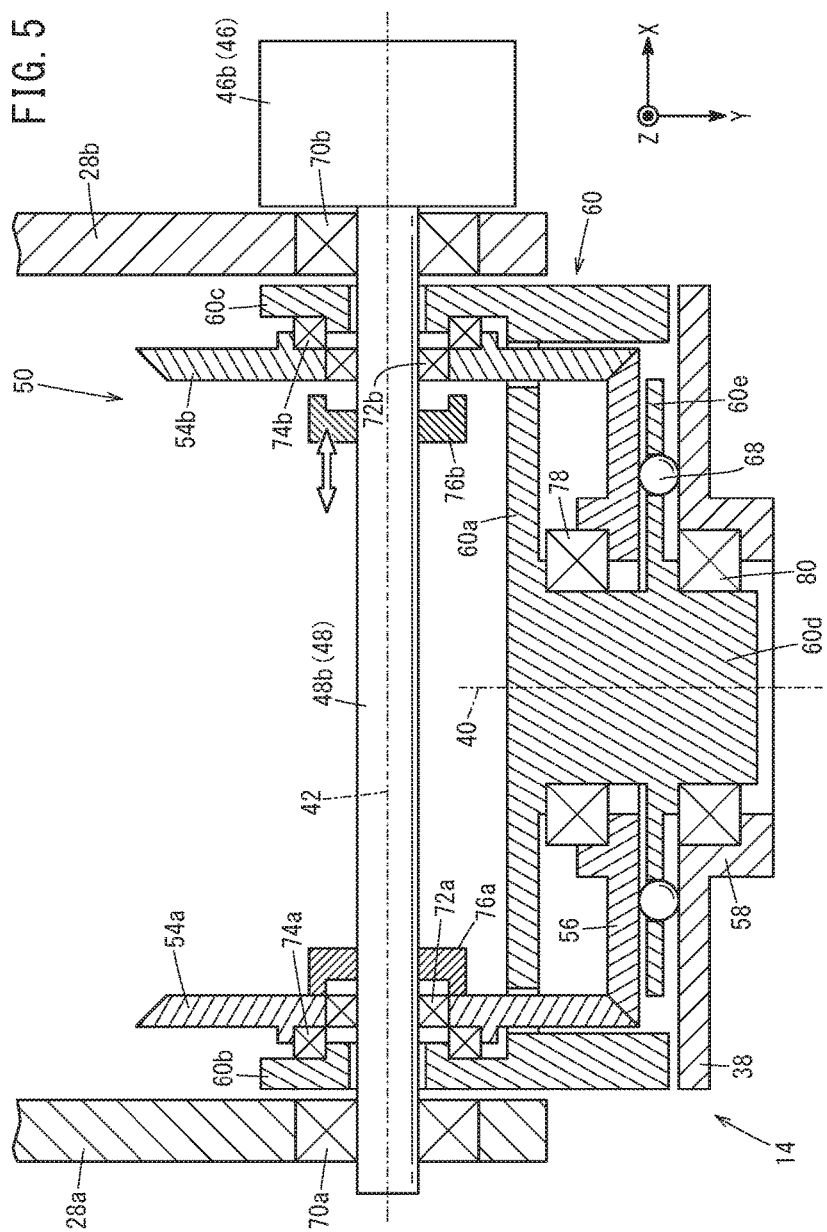

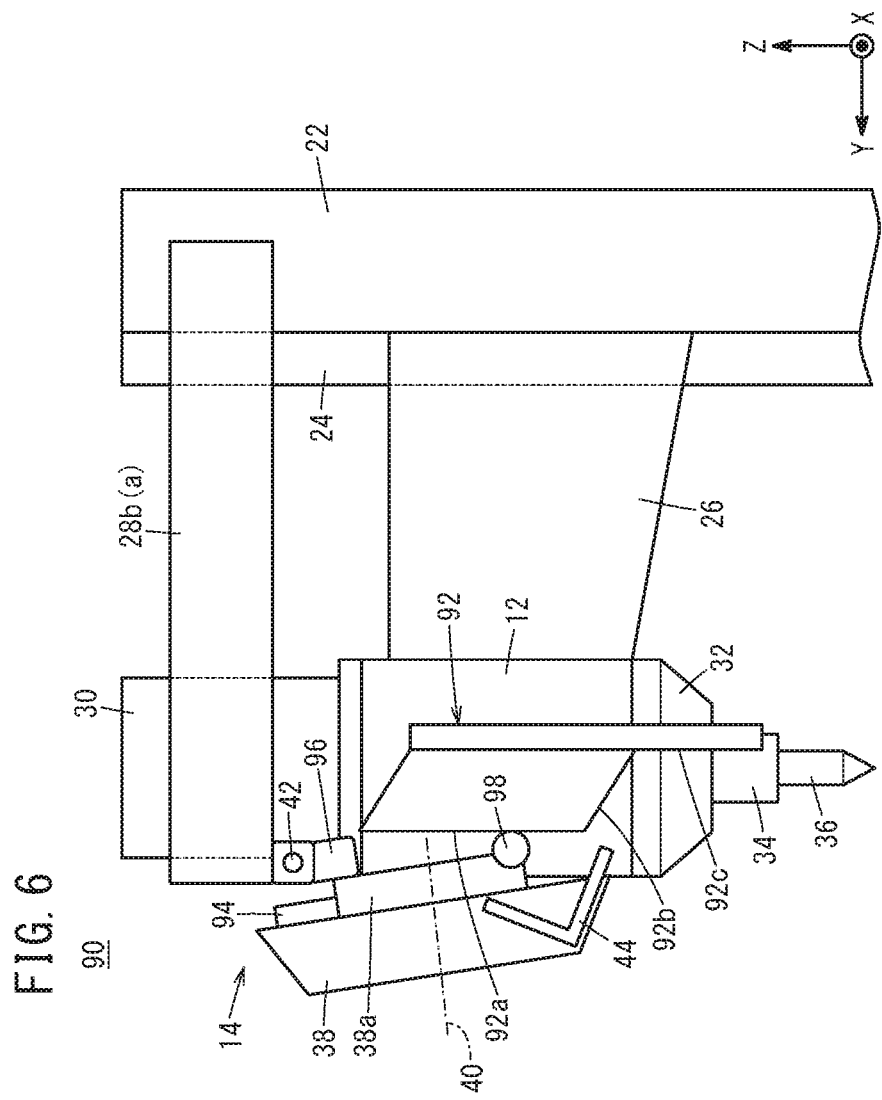

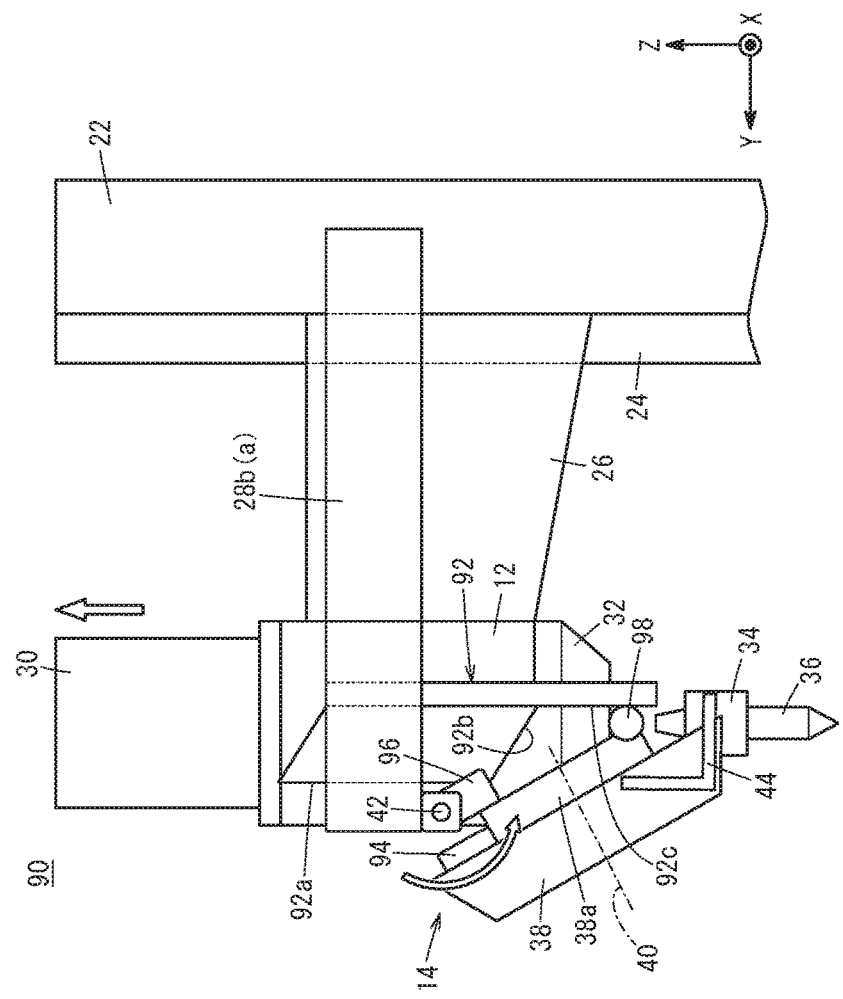

MACHINE TOOL

CROSS-REFERENCE TO RELATED APPLICATION

This application is based upon and claims the benefit of priority from Japanese Patent Application No. 2017-055931 filed on Mar. 22, 2017, the contents of which are incorporated herein by reference.

BACKGROUND OF THE INVENTION

Field of the Invention

The present invention relates to a machine tool that machines a target workpiece by using a tool detachably attached to a spindle.

Description of the Related Art

Japanese Laid-Open Patent Publication Nos. 2012-061526 and 2009-233791 disclose configurations where a turret includes, along a circumferential direction thereof, a plurality of grips that can hold a tool, and is attached to a frame of a machine tool, a cam groove is formed so as to extend in a vertical direction on a side surface of a spindle head that faces toward the turret, and the cam groove and a contact member of the turret that comes into contact with the cam groove cooperatively form a cam mechanism. The cam groove includes a flat portion that extends vertically along the side surface of the spindle head, and an inclined portion that inclines so as to get away from the turret, from the flat portion toward a distal end (lower end) of the spindle. Further, the turret is revolved by a rotational force of a motor.

In this case, the turret is revolved by the rotational force of the motor to thereby locate a predetermined grip at a lower side of the turret, and in such a state, the spindle head is moved upward relative to the frame by a feed axis mechanism, whereby the contact member of the turret in contact with the cam groove relatively moves downward along the cam groove. When the contact member relatively moves downward from the flat portion and along the inclined portion, the turret swings toward the distal end of the spindle, and the grip located at the lower side grips a tool attached to the distal end of the spindle. Thus, it is possible to exchange the tool attached to the distal end of the spindle.

SUMMARY OF THE INVENTION

However, according to each of the above patent publications, when the contact member moves along the inclined portion, the contact member moves at a relatively high speed and reaches a lower end of the inclined portion. Consequently, at the time of reaching, the turret is liable to receive a shock from the spindle head via the contact member. Therefore, when the contact member moves along the inclined portion, it is necessary to mitigate the shock to the turret by setting the feed speed of the axis of the feed axis mechanism to a low speed (low acceleration) and limiting a swinging speed of the turret. As a result, a long time is required for an operation of exchanging the tool.

Further, while the cam mechanism is used to swing the turret, the motor is used to revolve the turret. As a result, the number of parts required for a mechanism for tool exchanging becomes large, thereby leading to higher costs.

It is therefore an object of the present invention to provide a machine tool which is capable of reducing a time required for an operation of exchanging a tool, and also reducing the number of parts required for a mechanism for tool exchanging to thereby reduce the costs.

An aspect of the present invention is a machine tool configured to machine a target workpiece by using a tool detachably attached to a spindle, the machine tool including: a revolving-type turret including a plurality of grips provided along a circumferential direction thereof, each of the plurality of grips being configured to hold the tool attached to the spindle; a first rotary shaft configured to rotate about a swing axis of the turret; a second rotary shaft extending in a direction substantially perpendicular to the first rotary shaft, and configured to rotate the turret about a revolving axis; a motor configured to rotate the first rotary shaft; a power transmission unit including a first gear connected to the first rotary shaft and a second gear connected to the second rotary shaft, the second gear being configured to be meshed with the first gear; and a rotation prohibition unit configured to, when the turret is swung, prohibit rotation of the second rotary shaft in order to swing the second rotary shaft about the first rotary shaft.

According to the present invention, a cam mechanism is not used to perform swinging motion. Therefore, it is possible to avoid an occurrence of a shock to the turret during an operation of exchanging of the tool, and reduce a time required for the operation of exchanging the tool. Further, by using only one motor, swinging motion and revolving motion for the turret can be performed. Consequently, it is possible to reduce the number of parts required for a mechanism for exchanging the tool, and reduce the costs.

The above and other objects features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 5 is a cross-sectional view of the power transmission unit according to a second example;

FIG. 6 is a side view of a machine tool according to a comparative example; and

FIG. 7 is a side view of the machine tool according to the comparative example.

DESCRIPTION OF THE PREFERRED EMBODIMENTS

Preferred embodiments of a machine tool according to the present embodiment will be described in detail below with reference to the accompanying drawings.

[Configuration of Machine Tool]

Figure 1:
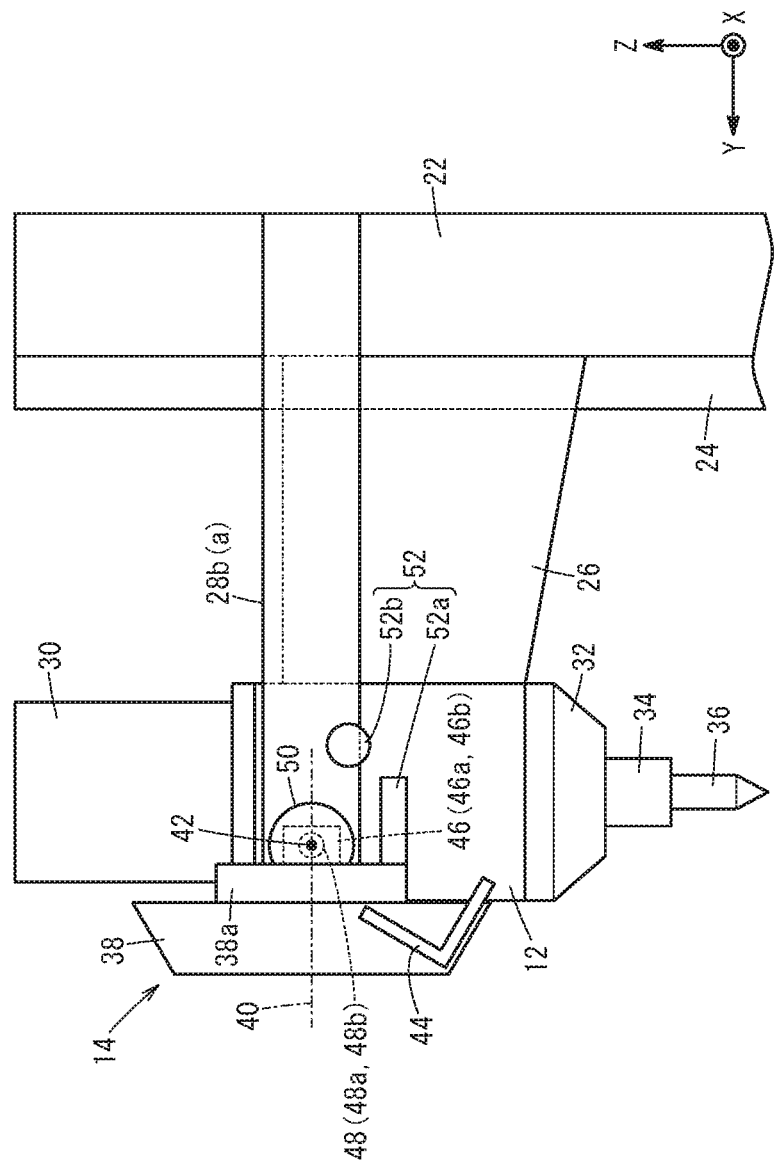
FIG. 1 is a side view of a machine tool according to an embodiment of the present invention.
Figure 2:
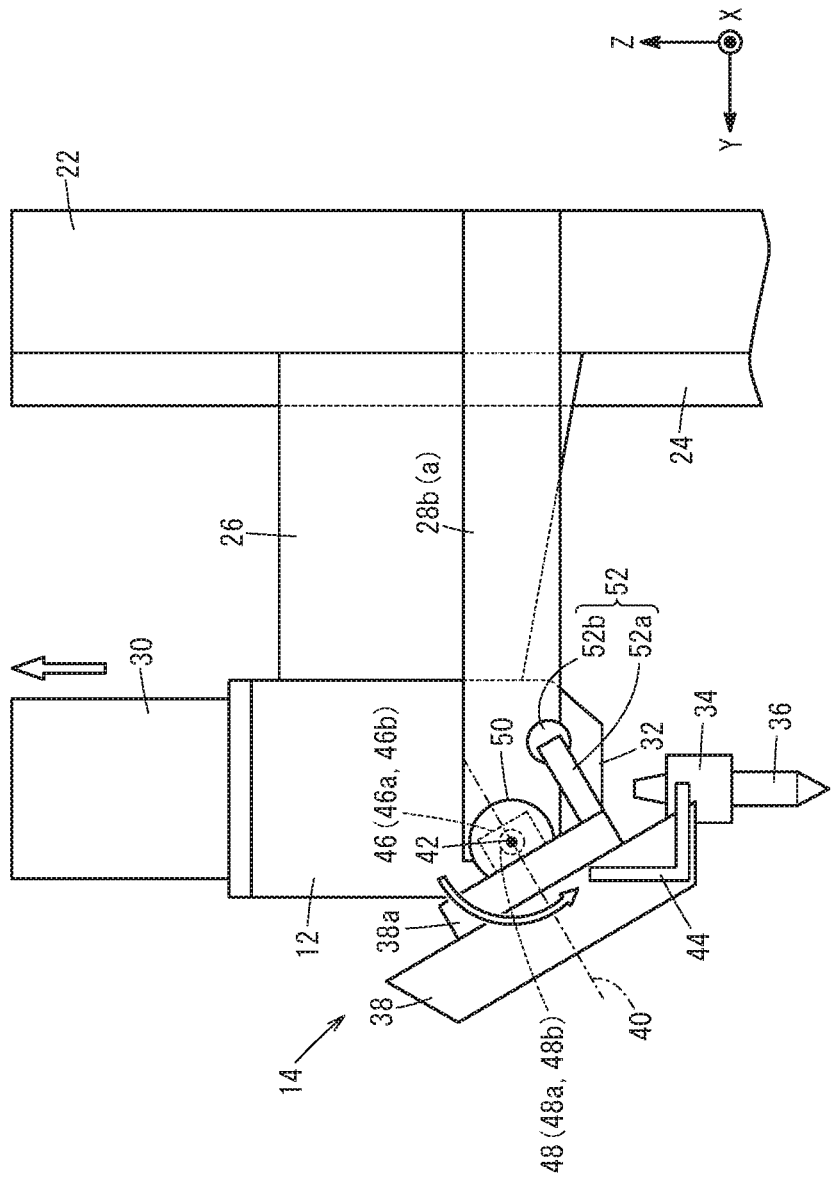
FIG. 2 is a side view showing a state where a tool is detached from a spindle in FIG. 1.

FIGS. 1 and 2 are side views of a machine tool 10 enlargedly showing the vicinity of a spindle head 12 and a tool exchanging mechanism 14 of the machine tool 10.

The machine tool 10 includes a column 22 that stands upright on an unillustrated base in a +Z direction (that is an arrow direction on a Z axis in FIGS. 1 and 2), a support member 26 that is movable along a rail 24 formed in a Z axis direction on a side surface of the column 22, the spindle head 12 that is supported above the base by the support member 26, is supported by the base so as to be movable in an X axis direction and a Y axis direction, and is movable in the Z axis direction with respect to a table on which a target workpiece is placed, and two frames 28a, 28b that extend from the column 22 toward a +Y direction (that is an arrow direction on a Y axis in FIGS. 1 and 2).

A spindle motor 30 is arranged at an upper portion of the spindle head 12. A spindle 32 is supported at a distal end (lower end) of the spindle head 12 on the table side, and can rotate about the Z axis by driving of the spindle motor 30. The spindle 32 detachably holds a tool 36 that is held in a tool holder 34. The tool 36 performs predetermined machining on the target workpiece. In this case, by inserting the tool holder 34 in an unillustrated attachment hole formed at a distal end portion of the spindle 32, the tool 36 is attached to the spindle 32. The tool 36 and the tool holder 34 rotate together with the spindle 32 by driving of the spindle motor 30.

The two frames 28a, 28b are provided with the tool exchanging mechanism 14 that exchange the tool 36 to be attached to the spindle 32. That is, the machine tool 10 is configured as a machining center that can automatically exchange the tool 36 by using the tool exchanging mechanism 14. The tool exchanging mechanism 14 includes a turret 38 that is a revolving-type tool magazine.

The turret 38 is supported at distal end portions of the two frames 28a, 28b so as to be revolvable about a revolving axis 40 that is a center axis and swingable about a swing axis 42 that is substantially perpendicular to the revolving axis 40. The turret 38 includes a plurality of grips 44 arranged along the circumferential direction at predetermined intervals. Each of the plurality of grips 44 detachably holds the tool 36 via the tool holder 34.

FIGS. 1 and 2 illustrate only one of the grips 44 on a lower side of the turret 38 for ease of illustration. In this case, when the support member 26 and the spindle head 12 are moved in the +Z axis direction (upper direction) along the rail 24 by an unillustrated feed axis mechanism, the tool exchanging mechanism 14 supported by the two frames 28a, 28b relatively moves in a −Z axis direction (lower direction) with respect to the support member 26 and the spindle head 12. Then, the turret 38 is revolved about the revolving axis 40 to thereby locate a predetermined grip 44 at a lower side of the turret 38. In such a state, when the turret 38 swings about the swing axis 42 in a counterclockwise direction in FIGS. 1 and 2, the grip 44 grips the tool holder 34. Consequently, the tool 36 and the tool holder 34 can be detached from the spindle 32.

In FIG. 1, the swing axis 42 is substantially parallel to an X axis and the revolving axis 40 is substantially parallel to the Y axis. In the machine tool 10 according to the present embodiment, the revolving axis 40 may not be parallel to the Y axis and the swing axis 42 may not be parallel to the X axis as long as the revolving axis 40 and the swing axis 42 are substantially perpendicular to each other.

The tool exchanging mechanism 14 further includes a motor (rotation prohibition unit) 46 that is fixed to the distal end portion of at least one of the frames 28a, 28b, a power transmission unit 50 that converts a rotational force of a rotary shaft (first rotary shaft) 48 of the motor 46 extending in the X axis direction into a force of rotation about the swing axis 42 to thereby swing the turret 38 or converts the rotational force of the motor 46 into a force of rotation about the revolving axis 40 to thereby revolve the turret 38, and a locking unit 52 that locks swinging of the turret 38 about the swing axis 42 at a predetermined angle. The power transmission unit 50 will be described below. The locking unit 52 includes an extension member 52a that extends rearward from a support portion 38a that supports the turret 38 at a rear of the turret 38 so as to be rotatable about the revolving axis 40, and a stopper member 52b that is arranged on each of side surfaces of the frames 28a, 28b. When the turret 38 swings about the swing axis 42 in the counterclockwise direction in FIGS. 1 and 2, the extension member 52a comes into abutment against the stopper member 52b to thereby prevent the turret 38 from further swinging in the counterclockwise direction.

[Basic Configuration and Operation of Power Transmission Unit]

Figure 3A:
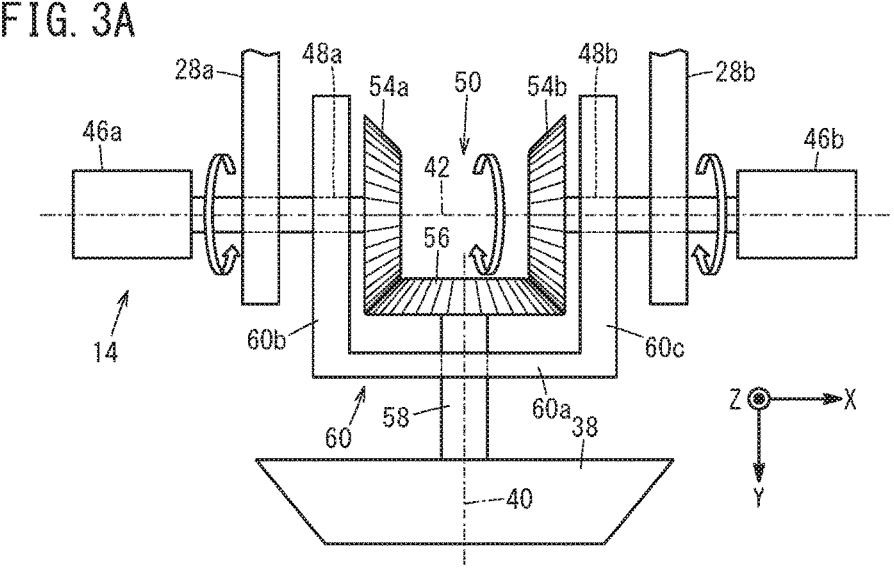
FIG. 3A is an explanatory view for schematically explaining a principal of a swinging operation according to the embodiment.
Figure 3B:
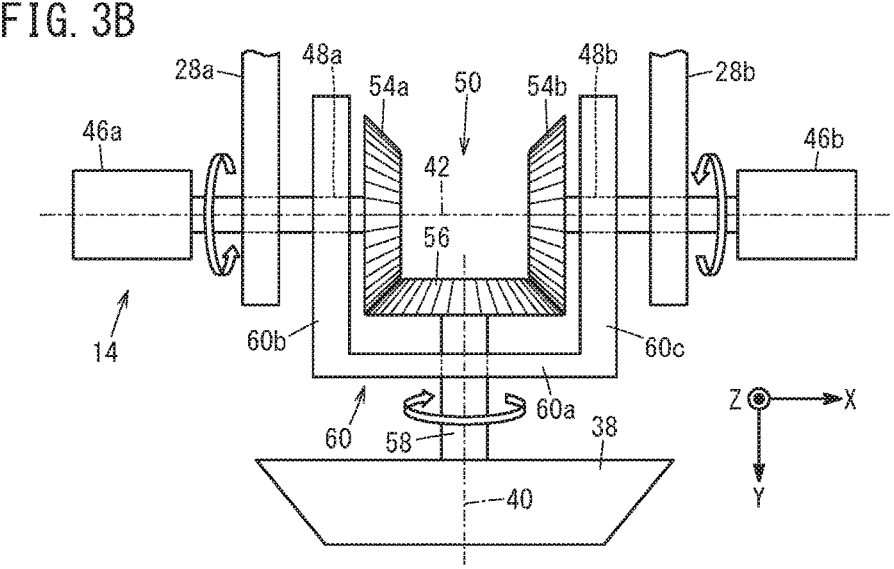
FIG. 3B is an explanatory view for schematically explaining a principal of a revolving operation according to the embodiment.

Next, the basic configuration and the operation of the power transmission unit 50 will be described with reference to FIGS. 3A and 3B. FIGS. 3A and 3B are explanatory views conceptually showing the configuration of the power transmission unit 50.

The power transmission unit 50 includes two first gears 54a, 54b that are disposed away from each other so as to be face-to-face with each other in the X axis direction (a direction of the swing axis 42), and a second gear 56 that is meshed with the two first gears 54a, 54b between the two first gears 54a, 54b.

In FIGS. 3A and 3B, the one first gear 54a on the left side is connected substantially coaxially with a rotary shaft (first rotary shaft) 48a of a first motor (rotation prohibition unit) 46a extending along a +X axis direction (that is an arrow direction on the X axis in FIGS. 1 to 3B), and can rotate about the rotary shaft 48a by driving of the first motor 46a. The rotary shaft 48a penetrates the frame 28a, and is supported by the frame 28a rotatably but immovably in an axial direction.

The other first gear 54b on the right side is connected substantially coaxially with a rotary shaft (first rotary shaft) 48b of a second motor (rotation prohibition unit) 46b extending along a −X axis direction (that is a direction opposite to the arrow direction on the X axis in FIGS. 1 to 3B), and can rotate about the rotary shaft 48b by driving of the second motor 46b. The rotary shaft 48b penetrates the other frame 28b, and is supported by the frame 28b rotatably but immovably in the axial direction.

The second gear 56 is coupled substantially coaxially to a rotary shaft (second rotary shaft) 58 of the turret 38 extending along a direction of the revolving axis 40 (the Y axis direction in FIGS. 3A and 3B), and can rotate about the rotary shaft 58 together with the turret 38.

The power transmission unit 50 further includes a substantially U-shaped case 60 arranged between the two frames 28a, 28b. The case 60 includes a base portion 60a that extends in the X axis direction on the side of the turret 38, a first support portion 60b that extends from one end of the base portion 60a on the side of the first motor 46a toward a −Y axis direction, and a second support portion 60c that extends from the other end of the base portion 60a on the side of the second motor 46b toward the −Y axis direction.

The rotary shaft 58 of the turret 38 penetrates a central portion of the base portion 60a. The rotary shaft 58 is supported by the base portion 60a rotatably but immovably in the axial direction. The rotary shaft 48a of the first motor 46a penetrates the first support portion 60b. The rotary shaft 48a is supported by the first support portion 60b rotatably but immovably in the axial direction. The rotary shaft 48b of the second motor 46b penetrates the second support portion 60c. The rotary shaft 48b is supported by the second support portion 60c rotatably but immovably in the axial direction. Thus, the first gears 54a, 54b and the second gear 56 are housed in a space inside the case 60.

The power transmission unit 50 switches between revolving motion of the turret 38 about the revolving axis 40 and swinging motion of the turret 38 about the swing axis 42, based on the operating principal of a differential gear mechanism. That is, the power transmission unit 50 switches between an input side and an output side for the differential gear mechanism to thereby transmit power for swinging motion or revolving motion to the turret 38.

Hereinafter, an operation (swinging motion) of swinging the turret 38 about the swing axis 42 will be described.

First, the first motor 46a and the second motor 46b are driven to rotate respectively the rotary shafts 48a, 48b in a direction illustrated in FIG. 3A. In this case, the rotary shafts 48a, 48b desirably should rotate about the rotary shafts 48a, 48b at the substantially same rotational speed and in the same rotational direction. Thus, the one first gear 54a connected to the rotary shaft 48a of the first motor 46a and the other first gear 54b connected to the rotary shaft 48b of the second motor 46b rotate in a rotational direction illustrated in FIG. 3A. As a result, a rotational force of each of the first gears 54a, 54b is transmitted to the second gear 56.

As described above, the first gears 54a, 54b rotate in the same rotational direction and at the substantially same rotational speed. Therefore, the second gear 56 meshed with the first gears 54a, 54b cannot rotate about the rotary shaft 58. Thus, the second gear 56 is subjected to a rotational force (swinging force) for rotation about the rotary shafts 48a, 48b (swing axis 42). This rotational force is transmitted from the second gear 56 to the turret 38 via the rotary shaft 58, and swings the turret 38 about the swing axis 42. The second gear 56 is supported by the base portion 60a of the case 60 rotatably about the rotary shaft 58 (revolving axis 40). Therefore, the case 60 is also swung about the swing axis 42. That is, the first motor 46a and the second motor 46b function as the rotation prohibition unit that prohibits rotation of the rotary shaft 58 in order to swing the rotary shaft 58 about the rotary shafts 48a, 48b when swinging the turret 38 (during the swinging motion).

FIG. 2 illustrates that the swinging operation in FIG. 3A swings the turret 38 about the swing axis 42 from an angular position in FIG. 1 in the counterclockwise direction. In addition, to swing the turret 38 about the swing axis 42 in the clockwise direction in FIGS. 1 and 2, each of the rotary shafts 48a, 48b is rotated at the substantially same rotational speed in a direction opposite to the rotational direction illustrated in FIG. 3A.

As described above, the tool exchanging mechanism 14 includes the locking unit 52 (see FIGS. 1 and 2). Hence, when the extension member 52a coupled to the support portion 38a of the swinging turret 38 comes into abutment against the stopper member 52b, the turret 38 is prevented from swinging in the counterclockwise direction. As a result, a prohibition state of rotation about the rotary shaft 58 is released, and the power transmission unit 50 transitions to the revolving operation for revolving the turret 38 about the revolving axis 40.

That is, according to the revolving operation, when the locking unit 52 prevents the turret 38 from swinging, only the first motor 46a is driven to rotate the rotary shaft 48a in the rotational direction illustrated in FIG. 3B. In this case, the rotary shaft 48b and the second motor 46b may be disengaged from each other to thereby place the rotary shaft 48b in a free rotation state. In this way, the first gear 54a connected to the rotary shaft 48a rotates about the rotary shaft 48a in the rotational direction, and transmits this rotational force to the second gear 56. The second gear 56 meshed with the first gear 54a is rotated about the rotary shaft 58 by the rotational force from the first gear 54a. Thus, the turret 38 coupled to the rotary shaft 58 revolves about the revolving axis 40 in the rotational direction illustrated in FIG. 3B. As the second gear 56 rotates, the first gear 54b meshed with the second gear 56 and the rotary shaft 48b of the second motor 46b connected to the first gear 54b also rotate in the rotational directions illustrated in FIG. 3B.

In the revolving operation, by rotating the rotary shaft 48a of the first motor 46a in the direction opposite to the rotational direction illustrated in FIG. 3B, it is possible to revolve the second gear 56 and the turret 38 in reverse directions, respectively. Further, in the revolving operation, also when the rotary shaft 48b of the second motor 46b is rotated and the rotary shaft 48a of the first motor 46a is placed in a free rotation state, it is possible to revolve the second gear 56 and the turret 38.

[Specific Configuration and Operation of Power Transmission Unit]

Next, the specific configuration and the operation of the power transmission unit 50 to which the operating principal in FIGS. 3A and 3B is applied will be described with reference to FIGS. 4 (first example) and 5 (second example). In the first example and the second example, one motor (the first motor 46a or the second motor 46b) is used to perform the swinging motion and the revolving motion for the turret 38. Further, the first example and the second example differ from the basic configuration in FIGS. 3A and 3B in that, the rotation prohibition unit for prohibiting rotation of the rotary shaft 58 during the revolving operation is a component other than the first motor 46a and the second motor 46b.

First Example

Figure 4:
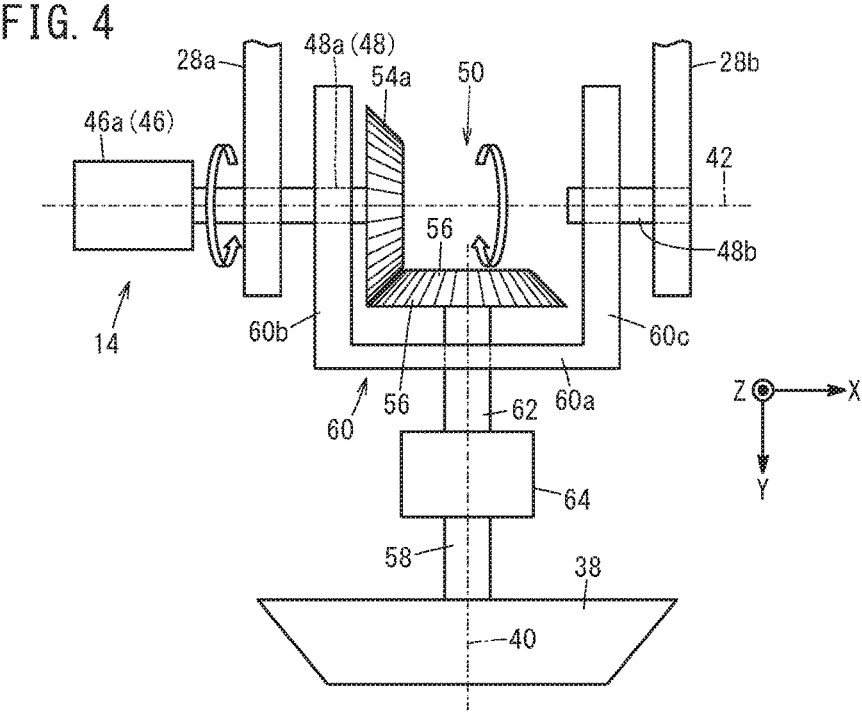
FIG. 4 is an explanatory view of a power transmission unit according to a first example.

The first example in FIG. 4 differs from the configuration in FIGS. 3A and 3B in that the second motor 46b is not provided, and the second gear 56 is connected to the rotary shaft 58 of the turret 38 via a rotary shaft 62 and a deceleration mechanism (rotation prohibition unit) 64. In this case, the second support portion 60c of the case 60 is supported via the rotary shaft 48b by the frame 28b rotatably but immovably in the axial direction. Therefore, the first example is a configuration example where the one first motor 46a is used to perform the swinging motion and the revolving motion for the turret 38.

The deceleration mechanism 64 has a higher rotational resistance than a rotational resistance produced when (the rotary shaft 58 and the second gear 56 connected to) the turret 38 is swung about the swing axis 42. According to the first example, when the first motor 46a is driven to rotate the rotary shaft 48a and the first gear 54a about the rotary shaft 48a in the rotational direction illustrated in FIG. 4, the rotational force is transmitted to the second gear 56. In this case, the rotational resistance of the deceleration mechanism 64 is higher than the rotational resistance produced when the turret 38 is swung about the swing axis 42. Therefore, the second gear 56 is subjected to the rotational force for rotation about the rotary shaft 48a (swing axis 42) illustrated in FIG. 4. This rotational force is transmitted from the second gear 56 to the turret 38 via the rotary shaft 62, the deceleration mechanism 64 and the rotary shaft 58, and swings the turret 38 about the swing axis 42. As a result, the case 60 that supports the rotary shaft 58 also is swung about the swing axis 42. That is, according to the first embodiment, the deceleration mechanism 64 functions as the rotation prohibition unit that prohibits the rotation of the rotary shaft 58 in order to swing the rotary shaft 58 about the rotary shafts 48a, 48b when swinging the turret 38.

Next, when the extension member 52a (see FIG. 2) coupled to the swinging turret 38 comes into abutment against the stopper member 52b, the turret 38 is prevented from swinging in the counterclockwise direction. Therefore, the prohibition state of the rotation about the rotary shaft 58 is released, and the power transmission unit 50 transitions to the revolving operation for revolving the turret 38 about the revolving axis 40. Similar to the case of FIG. 3B, in the revolving operation, when the first motor 46a is driven to rotate the rotary shaft 48a in the rotational direction illustrated in FIG. 4, the first gear 54a connected to the rotary shaft 48a rotates about the rotary shaft 48a in the rotational direction, and transmits this rotational force to the second gear 56. The second gear 56 is rotated about the rotary shaft 62 by the rotational force from the first gear 54a. Thus, the turret 38 revolves about the revolving axis 40 via the rotary shaft 62, the deceleration mechanism 64 and the rotary shaft 58.

Second Example

The second example in FIG. 5 differs from the configuration in FIGS. 3A to 4 in that the first motor 46a is not provided, the rotary shaft 48b of the second motor 46b is a rotary shaft 48 that is supported by the two frames 28a, 28b rotatably but immovably in the axial direction, and a sliding deceleration mechanism 68 is arranged between the second gear 56 and the turret 38.

In this case, the rotary shaft 48 extends in the X axis direction, and is supported via two bearings 70a, 70b by the two frames 28a, 28b rotatably but immovably in the axial direction. The one first gear 54a is supported via the bearing 72a by the rotary shaft 48 rotatably but immovably in the axial direction, and is supported via another bearing 74a by the first support portion 60b rotatably but immovably in the axial direction. The other first gear 54b is supported via the bearing 72b by the rotary shaft 48 rotatably but immovably in the axial direction, and is supported via another bearing 74b by the second support portion 60c rotatably but immovably in the axial direction.

A first power switching member 76a is provided on the rotary shaft 48 at a position closer to the second motor 46b than the one first gear 54a, and can be advanced and retreated to and from the first gear 54a by an unillustrated driving mechanism. The first power switching member 76a is connected unrotatably with respect to the rotary shaft 48 but movably in the axial direction of the rotary shaft 48.

In this case, the first power switching member 76a is placed into abutment against the first gear 54a by the driving mechanism, and is thereby connected unrotatably with respect to the first gear 54a. In the state of the abutment of the first power switching member 76a against the first gear 54a, a force of rotation about the axial direction of the rotary shaft 48 can be transmitted to the first gear 54a via the first power switching member 76a, and thus the term "abutment" is a concept including fitting, pressure-contact, contact or the like. The driving mechanism may be any type of mechanism as long as one can advance and retreat the first power switching member 76a to and from the first gear 54a in the X axis direction, and may be, for example, a driving mechanism that uses a fluid pressure or a spring force.

On the other hand, a second power switching member (rotation prohibition unit) 76b is provided on the rotary shaft 48 at a position closer to the one first gear 54a than the other first gear 54b, and can be advanced and retreated to and from the first gear 54b by the driving mechanism. The second power switching member 76b is connected unrotatably with the rotary shaft 48 but movably in the axial direction of the rotary shaft 48. In this case, the second power switching member 76b is placed into abutment against the first gear 54b by the driving mechanism, and is thereby connected unrotatably with the first gear 54b. In this case, similar to the first power switching member 76a, in the state of the abutment of the second power switching member 76b against the first gear 54b, the force of rotation about the axial direction of the rotary shaft 48 can be transmitted to the first gear 54b via the second power switching member 76b. The driving mechanism may be any type of mechanism as long as one can advance and retreat the second power switching member 76b to and from the first gear 54b in the X axis direction.

In the following description, a description will be given of a case that the first power switching member 76a is in abutment against the first gear 54a at all times, while the second power switching member 76b is retreated from the first gear 54b by the driving mechanism, and therefore the one first gear 54a is connected unrotatably with the rotary shaft 48 and the other first gear 54b is connected rotatably with the rotary shaft 48.

In the case 60, the first support portion 60b and the second support portion 60c further extend from respective portions connected with the base portion 60a toward the turret 38. The base portion 60a is provided with a shaft portion 60d that extends substantially coaxially with the revolving axis 40 toward the turret 38. The shaft portion 60d is provided with a plate-shaped portion 60e that extends in the X axis direction toward the first support portion 60b and the second support portion 60c. In a space formed by the first support portion 60b, the second support portion 60c, the base portion 60a, the shaft portion 60d and the plate-shaped portion 60e, the second gear 56 is supported via a bearing 78 on the base portion 60a and the shaft portion 60d rotatably but immovably in the axial direction. The turret 38 is supported via a bearing 80 on the shaft portion 60d rotatably but immovably in the axial direction. The sliding deceleration mechanism 68 is arranged on the plate-shaped portion 60e between the second gear 56 and the turret 38.

According to the second example, first, the driving mechanism places the first power switching member 76a in abutment against the one first gear 54a, and places the second power switching member 76b in abutment against the other first gear 54b. Next, when the second motor 46b is driven to rotate the rotary shaft 48, the one first gear 54a rotates about the rotary shaft 48 via the first power switching member 76a, and the other first gear 54b rotates about the rotary shaft 48 via the second power switching member 76b.

In this case, the first gears 54a, 54b rotate in the same direction and at the substantially same rotational speed, and rotational forces thereof are transmitted to the second gear 56. As a result, the second gear 56 is subjected to the force for rotation about the rotary shaft 48, and this rotational force is transmitted to the turret 38 via the sliding deceleration mechanism 68. Thus, the turret 38 swings integrally with the second gear 56, the rotary shaft 58, the case 60 and the sliding deceleration mechanism 68 about the swing axis 42. That is, according to the second example, the second power switching member 76b functions as the rotation prohibition unit that prohibits the rotation of the rotary shaft 58 in order to swing the rotary shaft 58 about the rotary shaft 48 when swinging the turret 38.

Subsequently, when the extension member 52a (see FIG. 2) coupled to the swinging turret 38 comes into abutment against the stopper member 52b to thereby prevent the turret 38 from swinging in the counterclockwise direction, the second power switching member 76b is separated away from the first gear 54b by the driving mechanism. Thus, the prohibition state of the rotation about the rotary shaft 58 is released, and the power transmission unit 50 transitions from the swinging operation to the revolving operation for revolving the turret 38 about the revolving axis 40.

Next, when the second motor 46b is driven to cause rotation about the rotary shaft 48, the first gear 54a connected to the rotary shaft 48 via the first power switching member 76a rotates about the rotary shaft 48, and the rotational force is transmitted to the second gear 56. The second gear 56 is rotated about the rotary shaft 58 by the rotational force from the first gear 54a. As a result, the turret 38 revolves about the revolving axis 40 via the sliding deceleration mechanism 68 and the rotary shaft 58. According to the second example, it is possible to switch between the revolving motion and the swinging motion by moving the first power switching member 76a or the second power switching member 76b along the rotary shaft 48 to thereby place the switching member in abutment against the first gear 54a or the first gear 54b. Thus, in the second example, the locking unit 52 can be omitted.

[Effect of Machine Tool]

The effect of the machine tool 10 according to the above described present embodiment will be described.

FIGS. 6 and 7 are explanatory views of a machine tool 90 according to a comparative example. The same components as those of the machine tool 10 according to the present embodiment in FIGS. 1 to 5 will be assigned the same reference numerals, and will not be described in detail. The machine tool 90 according to the comparative example in FIGS. 6 and 7 differs from the machine tool 10 according to the present embodiment in that the turret 38 is swung by using a cam mechanism 92 arranged on the side surface of the spindle head 12, and the turret 38 is revolved about the revolving axis 40 by using a motor 94 provided on the support portion 38a of the turret 38.

In the machine tool 90, the turret 38 is swingably supported on the swing axis 42 arranged at the distal end portions of the two frames 28a, 28b via a coupling member 96 provided on an upper side of the support portion 38a. The motor 94 is provided on the upper side of the support portion 38a. A disk-shaped contact member 98 is provided on a lower side of the support portion 38a and is capable of coming into contact with the cam mechanism 92.

The cam mechanism 92 is arranged on the side surface of the spindle head 12, and along the −Z axis direction from the spindle motor 30 to a lower side of the spindle 32. The cam mechanism 92 includes a first flat portion 92a that is adjacent to the turret 38 on the side of the spindle motor 30 and extends along −Z axis direction, an inclined portion 92b that extends obliquely downward from a lower end of the first flat portion 92a and is inclined away from the turret 38, and a second flat portion 92c that extends downward (toward the tool 36) from a lower end of the inclined portion 92b near the spindle 32 along the −Z axis direction.

In this case, when the support member 26 is moved upward along the rail 24 by the feed axis mechanism, the spindle head 12 coupled to the support member 26 moves upward. In this case, the two frames 28a, 28b are fixed to the column 22, and the turret 38 is pivotally supported by the two frames 28a, 28b via the swing axis 42 and the coupling member 96. Hence, the turret 38 moves relatively downward with respect to the spindle head 12. The contact member 98 of the turret 38 is in contact with the first flat portion 92a of the cam mechanism 92. Therefore, when the cam mechanism 92 moves upward along the Z axis direction together with the spindle head 12, the contact member 98 moves relatively downward while being held in contact with the first flat portion 92a.

When the contact member 98 moves to a lower end of the first flat portion 92a and then moves along the inclined portion 92b, the contact member 98 moves obliquely downward along the inclined portion 92b, and the turret 38 pivotally supported by the swing axis 42 swings in the counterclockwise direction in FIGS. 6 and 7. Subsequently, the contact member 98 moves to a lower end of the inclined portion 92b and then moves downward along the second flat portion 92c. Since the contact member 98 moves downward along the second flat portion 92c, the turret 38 pivotally supported by the swing axis 42 moves relatively downward while maintaining a state where the turret 38 is inclined at a predetermined angle.

Next, operation of the feed axis mechanism is stopped in a state where the turret 38 is lowered to a predetermined position, and then the motor 94 is driven to revolve the turret 38 about the revolving axis 40, whereby a desired grip 44 is located at a lower side of the turret 38. Next, the feed axis mechanism is driven again to thereby move the spindle head 12 upward, so that the turret 38 is moved relatively downward. Consequently, the tool holder 34 is gripped by the grip 44, so that it is possible to move the tool 36 and the tool holder 34 downward and separate them away from the spindle 32.

However, in the machine tool 90 according to the comparative example, the turret 38 is swung by the cam mechanism 92. Therefore, when the contact member 98 moves relatively downward along the inclined portion 92b, the contact member 98 moves at a relatively high speed and reaches the lower end of the inclined portion 92b. Accordingly, when the contact member 98 reaches the lower end, the turret 38 is likely to receive a shock from the spindle head 12 via the contact member 98. Therefore, when the contact member 98 moves along the inclined portion 92b, it is necessary to set the feed speed of the feed axis mechanism to a low speed (low acceleration), limit the swinging speed of the turret 38 and thereby mitigate the shock to the turret 38. As a result, a long time is required for an operation of exchanging the tool 36 and the tool holder 34.

Further, the cam mechanism 92 is used to swing the turret 38, while the motor 94 is used to revolve the turret 38. Therefore, the number of parts required for a mechanism for exchanging the tool 36 and the tool holder 34 is large, thereby incurring higher costs.

By contrast with this, the machine tool 10 according to the present embodiment employs the configuration described with reference to FIGS. 1 to 5, and the cam mechanism 92 is not used for swinging motion. Therefore, it is possible to avoid an occurrence of the shock to the turret 38 during the operation of exchanging the tool 36 and the tool holder 34, and reduce a time required for the operation of exchanging the tool 36 and the tool holder 34. A single motor 46 can perform swinging motion and revolving motion for the turret

38. Thus, it is possible to reduce the number of parts required for a mechanism for exchanging the tool 36 and the tool holder 34, and reduce the costs.

Technical Concepts Obtained from Embodiments

The technical concepts that can be grasped from the above embodiments will be described below.

A machine tool (10) configured to machine a target workpiece by using a tool (36) detachably attached to a spindle (32) includes: a revolving-type turret (38) including a plurality of grips (44) provided along a circumferential direction thereof, each of the plurality of grips (44) being configured to hold the tool (36) attached to the spindle (32); a first rotary shaft (48, 48*a*, 48*b*) configured to rotate about a swing axis (42) of the turret (38); a second rotary shaft (58) extending in a direction substantially perpendicular to the first rotary shaft (48, 48*a*, 48*b*), and configured to rotate the turret (38) about a revolving axis (40); a motor (46, 46*a*, 46*b*) configured to rotate the first rotary shaft (48, 48*a*, 48*b*); a power transmission unit (50) including a first gear (54*a*, 54*b*) connected to the first rotary shaft (48, 48*a*, 48*b*) and a second gear (56) connected to the second rotary shaft (58), the second gear (56) being configured to be meshed with the first gear (54*a*, 54*b*); and a rotation prohibition unit (46, 46*a*, 46*b*, 64, 76*b*) configured to, when the turret (38) is swung, prohibit rotation of the second rotary shaft (58) in order to swing the second rotary shaft (58) about the first rotary shaft (48, 48*a*, 48*b*).

Thus, since a cam mechanism is not used for swinging motion, it is possible to avoid the occurrence of the shock to the turret (38) during the operation of exchanging the tool (36), and reduce the time required for the operation of exchanging the tool (36). By using only one motor (46, 46*a*, 46*b*), the swinging motion and the revolving motion for the turret (38) can be performed. Consequently, it is possible to reduce the number of parts required for a mechanism for exchanging the tool (36), and reduce the costs.

In the machine tool (10), the power transmission unit (50) may include the two first gears (54*a*, 54*b*), the two first gears (54*a*, 54*b*) may be disposed away from each other so as to be face-to-face with each other, the second gear (56) may be meshed with the two first gears (54*a*, 54*b*) between the two first gears (54*a*, 54*b*), and the rotation prohibition unit (46*a*, 46*b*) may include a first motor (46*a*) configured to rotate only one first gear (54*a*) of the two first gears (54*a*, 54*b*), and a second motor (46*b*) configured to rotate only the other first gear (54*b*), and may be configured to, when the turret (38) is swung, rotate the two first gears (54*a*, 54*b*) in the same direction and thereby prohibit rotation of the second rotary shaft (58), and when the turret (38) is revolved, rotate the two first gears (54*a*, 54*b*) in mutually opposite directions and thereby rotate the second rotary shaft (58). Consequently, it is possible to efficiently switch between the swinging motion of the turret (38) and the revolving motion of the turret (38).

In the machine tool (10), the power transmission unit (50) may include the two first gears (54*a*, 54*b*), the two first gears (54*a*, 54*b*) may be disposed away from each other so as to be face-to-face with each other, one first gear (54*a*) of the two first gears (54*a*, 54*b*) is unrotatably connected to the first rotary shaft (48), and the other first gear (54*b*) is rotatably connected to the first rotary shaft (48), the second gear (56) may be configured to be meshed with the two first gears (54*a*, 54*b*) between the two first gears (54*a*, 54*b*), the rotation prohibition unit (76*b*) may be a power switching member (76*b*) connected to the first rotary shaft (48) unrotatably but movably in an axial direction of the first rotary shaft (48), and may be configured to, when the turret (38) is swung, be moved in the axial direction and come into abutment against the other first gear (54*b*) to thereby rotate the two first gears (54*a*, 54*b*) in the same direction and prohibit rotation of the second rotary shaft (58), and when the turret (38) is revolved, be moved away from the other first gear (54*b*) to thereby rotate the second rotary shaft (58). Thus, with a simple mechanism, it is possible to switch between the swinging motion of the turret (38) and the revolving motion of the turret (38).

The machine tool (10) may further include a locking unit (52) configured to lock swinging of the turret (38) at a predetermined angle, and the rotation prohibition unit (64) may be a deceleration mechanism (64) having a higher rotational resistance than a rotational resistance of the turret (38) about the swing axis (42), the second gear (56) may be connected to the second rotary shaft (58) via the rotation prohibition unit (64), and the rotation prohibition unit (64) may be configured to prohibit rotation of the second gear (56) before the turret (38) is locked by the locking unit (52), and rotate the second gear (56) when the locking unit (52) locks the turret (38) as a result of swinging of the turret (38). Consequently, it is possible to smoothly switch from the swinging motion of the turret (38) to the revolving motion of the turret (38).

While the invention has been particularly shown and described with reference to preferred embodiments, it will be understood that variations and modifications can be effected thereto by those skilled in the art without departing from the scope of the invention as defined by the appended claims.

What is claimed is:

1. A machine tool configured to machine a target workpiece by using a tool detachably attached to a spindle, the machine tool comprising:

a revolving-type turret including a plurality of grips provided along a circumferential direction thereof, each of the plurality of grips being configured to hold the tool attached to the spindle;

a first rotary shaft configured to rotate about a swing axis of the turret;

a second rotary shaft having a longitudinal axis extending in a direction substantially perpendicular to a longitudinal axis of the first rotary shaft, and configured to rotate the turret about a revolving axis;

a motor configured to rotate the first rotary shaft;

a power transmission unit including a first gear arrangement connected to the first rotary shaft and a second gear connected to the second rotary shaft, the second gear being configured to be meshed with the first gear arrangement; and a rotation prohibition unit configured to, when the turret is swung about the swing axis, prohibit rotation of the second rotary shaft about the revolving axis in order to swing the second rotary shaft about the first rotary shaft, wherein:

the first gear arrangement of the power transmission unit comprises two first gears;

the two first gears are disposed away from each other so as to be face-to-face with each other, one first gear of the two first gears is unrotatably connected to the first rotary shaft, and another first gear of the two first gears is rotatably connected to the first rotary shaft;

the second gear is configured to be meshed with the two first gears between the two first gears;

the rotation prohibition unit is a power switching member connected to the first rotary shaft unrotatably but movably in an axial direction of the first rotary shaft, the rotation prohibition unit being configured to, when the turret is swung about the swing axis, be moved in the axial direction and come into abutment against the another first gear to thereby enable rotation of the two first gears in a same direction and prohibit rotation of the second rotary shaft about the revolving axis, and when the turret is revolved about the revolving axis, be moved away from the another first gear to thereby enable rotation of the second rotary shaft about the revolving axis.

2. A machine tool configured to machine a target workpiece by using a tool detachably attached to a spindle, the machine tool comprising:

- a revolving-type turret including a plurality of grips provided along a circumferential direction thereof, each of the plurality of grips being configured to hold the tool attached to the spindle;
- a first rotary shaft configured to rotate about a swing axis of the turret;
- a second rotary shaft having a longitudinal axis extending in a direction substantially perpendicular to a longitudinal axis of the first rotary shaft, and configured to rotate the turret about a revolving axis;
- a motor configured to rotate the first rotary shaft;
- a power transmission unit including a first gear connected to the first rotary shaft and a second gear connected to the second rotary shaft, the second gear being configured to be meshed with the first gear; and
- a rotation prohibition unit configured to, when the turret is swung about the swing axis, prohibit rotation of the second rotary shaft about the revolving axis in order to swing the second rotary shaft about the first rotary shaft, and
- a locking unit configured to lock swinging of the turret about the swing axis at a predetermined angle, wherein:
- the rotation prohibition unit is a deceleration mechanism having a higher rotational resistance than a rotational resistance of the turret about the swing axis;
- the second gear is connected to the second rotary shaft via the rotation prohibition unit; and
- the rotation prohibition unit is configured to prohibit rotation of the second gear about the revolving axis before the turret is locked by the locking unit, and to permit rotation of the second gear about the revolving axis when the locking unit locks the turret as a result of swinging of the turret about the swing axis.

* * * * *